United States Patent
Noltemeyer et al.

(10) Patent No.: US 11,391,629 B2
(45) Date of Patent: Jul. 19, 2022

(54) INTERFEROMETER AND METHOD FOR PRODUCING AN INTERFEROMETER

(71) Applicant: Robert Bosch GmbH, Stuttgart (DE)

(72) Inventors: Ralf Noltemeyer, Herrenberg (DE); Christian Huber, Ludwigsburg (DE); Reinhold Roedel, Reutlingen (DE); Benedikt Stein, Stuttgart (DE); Christoph Schelling, Stuttgart (DE); Christoph Daniel Kraemmer, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 50 days.

(21) Appl. No.: 17/047,278

(22) PCT Filed: Apr. 10, 2019

(86) PCT No.: PCT/EP2019/059035
§ 371 (c)(1),
(2) Date: Mar. 4, 2021

(87) PCT Pub. No.: WO2019/201694
PCT Pub. Date: Oct. 24, 2019

(65) Prior Publication Data
US 2021/0262858 A1    Aug. 26, 2021

(30) Foreign Application Priority Data

Apr. 17, 2018   (DE) .................... 10 2018 205 778.8

(51) Int. Cl.
*G01J 3/26*   (2006.01)
*G01J 3/02*   (2006.01)
(Continued)

(52) U.S. Cl.
CPC .................. *G01J 3/26* (2013.01); *G01J 3/021* (2013.01); *G01J 3/0237* (2013.01); *G02B 26/001* (2013.01); *G01J 2003/1247* (2013.01)

(58) Field of Classification Search
CPC .. G01J 2003/1247; G01J 3/021; G01J 3/0237; G01J 3/027; G01J 3/0291; G01J 3/26; G01J 5/0235; G02B 26/001
See application file for complete search history.

(56) References Cited

U.S. PATENT DOCUMENTS

| 7,844,145 B1 | 11/2010 | Walters |
| 8,854,720 B2 | 10/2014 | Huang |

(Continued)

FOREIGN PATENT DOCUMENTS

| DE | 102 26 305 C1 | 10/2003 |
| DE | 696 28 669 T2 | 4/2004 |

(Continued)

OTHER PUBLICATIONS

International Search Report corresponding to PCT Application No. PCT/EP2019/059035, dated Aug. 7, 2019 (German and English language document) (6 pages).

*Primary Examiner* — Hina F Ayub
(74) *Attorney, Agent, or Firm* — Maginot, Moore & Beck LLP

(57) ABSTRACT

An interferometer includes a holding element having an actuation recess, a first mirror element arranged on the holding element opposite the actuation recess, and a second mirror element arranged opposite the first mirror element at a mirror distance, to form an optical slit. The first mirror element is arranged between the second mirror element and the holding element and the optical slit is spatially separated from the actuation recess by the first mirror element. The interferometer further includes an electrode pair including a first actuation electrode in one of the mirror elements and a (Continued)

second actuation electrode on a side of the actuation recess opposite the first actuation electrode. The mirror distance can be varied by applying an electrical voltage to the electrode pair.

16 Claims, 10 Drawing Sheets

(51) Int. Cl.
  *G02B 26/00* (2006.01)
  *G01J 3/12* (2006.01)

(56) References Cited

U.S. PATENT DOCUMENTS

| | | | |
|---|---|---|---|
| 2001/0028503 A1* | 10/2001 | Flanders | G01J 3/26 359/578 |
| 2005/0068627 A1 | 3/2005 | Nakamura et al. | |
| 2012/0050751 A1 | 3/2012 | Blomberg | |
| 2014/0022643 A1 | 1/2014 | Hirokubo | |
| 2016/0286054 A1 | 9/2016 | Kuri | |

FOREIGN PATENT DOCUMENTS

| | | | | |
|---|---|---|---|---|
| EP | 2687832 A1 * | 1/2014 | | G01J 3/26 |
| JP | 2012-127862 A | 7/2012 | | |
| WO | 02/086582 A1 | 10/2002 | | |
| WO | 2018/024543 A1 | 2/2018 | | |

* cited by examiner

INTERFEROMETER AND METHOD FOR PRODUCING AN INTERFEROMETER

This application is a 35 U.S.C. § 371 National Stage Application of PCT/EP2019/059035, filed on Apr. 10, 2019, which claims the benefit of priority to Serial No. DE 10 2018 205 778.8, filed on Apr. 17, 2018 in Germany, the disclosures of which are incorporated herein by reference in their entirety.

The disclosure is based on an interferometer device and a method for producing an interferometer. The present disclosure also relates to a computer program.

BACKGROUND

Tunable spectral filters with the possibility of miniaturization may be produced by means of MEMS technology, for example as a Fabry-Pérot interferometer. In this case, use is made of the fact that a cavity consisting of two highly reflective plane-parallel mirrors with a spacing from one another in the range of optical wavelengths exhibits a high transmission only for wavelengths at which the cavity length corresponds to an integer multiple of half the wavelength. The spacing, also referred to as the cavity length, may for example be changed by means of electrostatic or piezoelectric actuation, so that a spectrally tunable filter element is formed. One critical factor influencing the performance of such a spectrometer is the parallelism, or plane-parallelism, of the two mirrors. This should be as high as possible so that a defined cavity length with an effective finesse that is as great as possible is formed between the two mirrors.

A large number of known Fabry-Pérot interferometers use electrostatic actuation of the mirrors, as described for example in the documents US 2012050751, US 2014022643 or DE10226305. In this case, a voltage is applied between two electrodes which are located on the plane of the two mirrors, or alternatively on a plane parallel to the mirrors, so that the two mirrors move toward one another because of the electrostatic attraction. The mirrors are in this case configured either as a membrane mirror or as a solid mirror on a substrate.

With this form of electrostatic actuation, the maximum displacement path of the mirrors with respect to one another is physically limited to one third of the initial spacing of the electrodes, since spontaneous snapping together of the electrodes, also referred to as snap-in or pull-in, occurs with larger displacement paths, so that the Fabry-Pérot interferometer may be damaged. A displacement path that is as large as possible is advantageous for a Fabry-Pérot interferometer, since this gives the tunable wavelength range which can be interferometrically addressed. The displacement path may, for example, be increased by applying the electrodes and the mirror layer on different planes in the case of at least one of the mirrors. In document US2014022643, for example, the mirror is applied on a platform and the electrodes are applied in an indentation, so that the spacing of the electrodes is greater than the spacing of the mirrors. In this case, however, the mirrors are still actuated onto one another. Because of the greater electrode spacing, a higher actuation voltage is required for the same displacement path. Furthermore, such an approach with adjacently arranged gaps of different sizes for the optics and the actuation can be produced only with difficulty for membrane mirrors.

DE 69628669 T2 describes a tunable Fabry-Pérot interferometer, which comprises two membranes with abutments that are arranged on two opposite sides of a holding structure. Each membrane is respectively connected to a voltage source. By applying an electrical voltage, the membranes can respectively be deflected relative to the holding structure and therefore relative to one another.

In summary, the prior art therefore only allows a component architecture in which the maximum transmission wavelength is rigidly predetermined on the basis of the initial mirror spacing at rest by the process management and the minimum transmission wavelength is limited by the electrostatic snap-in.

SUMMARY

Against this background, with the approach proposed here an interferometer, a method for producing an interferometer, furthermore a device which uses this method, and lastly a corresponding computer program are proposed.

The approach proposed here is based on the discovery that an interferometer, for instance a tunable Fabry-Pérot interferometer with electrostatic actuation for reducing or increasing a mirror spacing, may be produced with mirrors that are arranged on a common side of a substrate or alternatively between a cover and the substrate. Advantageously, extension of the maximum displacement path is made possible independently of the transmission range of the interferometer by separation of an optical gap between the mirrors from an actuation gap. This remedies the deficiency of conventionally restricted tunability of Fabry-Pérot interferometers due to an insufficient displacement path in the case of electrostatic actuation. Independent adjustment of an initial transmission wavelength and of a displacement range is therefore made possible. For example, the approach proposed here also allows bidirectional actuation of the mirrors, so that with a prescribed maximum voltage the displacement path is increased in comparison with unidirectional actuation. Furthermore, the risk of electrostatic snap-in or pull-in of the mirror layers is reduced since, because of the greater possible displacement path, it is possible to operate the system further away from the pull-in point and, in the case of unidirectional operation, the mirrors are actuated away from one another, i.e. the spacing between the mirrors is increased.

The approach described here makes it possible to provide mechanically and optically symmetrical systems, which are more robust in respect of the coupling in of external perturbations, for example vibrations. Since the structure also has a high symmetry in optical terms with respect to the refractive indices of the materials involved, the maximum transmission is likewise increased since the mirrors can be produced with identical reflection.

An interferometer having the following features is proposed:

a holding element with an actuation recess;

a first mirror element, which is arranged or arrangeable on the holding element, opposite the actuation recess;

a second mirror element, which is arranged or arrangeable opposite the first mirror element at a mirror spacing in order to form an optical gap, the first mirror element being arranged or arrangeable between the second mirror element and the holding element and the optical gap being spatially separated from the actuation recess by the first mirror element; and an electrode pair consisting of a first actuation electrode, which is defined, arranged and/or arrangeable on or in one of the mirror elements, and a second actuation electrode, which is arranged or arrangeable on a side of the actuation recess facing toward the first actuation electrode, the mirror spacing being changeable by applying an electrical voltage to the electrode pair.

An interferometer may, for example, be understood as meaning a Fabry-Perot interferometer or another device for filtering electromagnetic waves by means of interference. The interferometer may, for example, be produced in MEMS technology. A first or second mirror element may be understood as meaning a reflective element which is semitransmissive for electromagnetic radiation, for instance in the form of a mirror membrane or a mirror layer. A holding element may, for example, be understood as meaning an element which has a substrate layer, for instance in the form of a substrate wafer, or a cover of the interferometer, for instance in the form of a cover wafer. In addition, the holding element may furthermore also have an additional layer, for example a sacrificial layer, in which the actuation recess is introduced. In this way, for example, by selection of the material of the additional layer, particularly simple formation of the actuation recess in the holding element may be made possible, while stable holding, for example of the mirror elements and of the electrode pair, may nevertheless be ensured. Spatial separation of the optical gap from the actuation recess by the first mirror element may be understood as meaning that, for example, the first mirror element is arranged between the optical gap and the actuation recess. In this case, the first mirror element does not necessarily need to be configured in such a way that fluidic separation of the optical gap from the actuation recess is also ensured; for example, the first mirror element may also be perforated or have a perforation pattern, so that the first mirror element nevertheless spatially separates the optical gap from the actuation recess according to the interpretation of this description.

For example, in one embodiment of the approach proposed here, an actuation gap may be delimited by the first mirror element, which is arranged or arrangeable on the holding element, opposite the actuation recess. The optical gap may be spatially separated from the actuation gap by the first mirror element.

One particularly advantageous embodiment of the approach proposed here is one in which the first actuation electrode is defined, arranged and/or arrangeable on or in the first mirror element. Such an embodiment offers the advantage that the optical gap may thereby be increased when an electrical voltage is applied to the electrode pair, so that the risk of snap-in of the two mirror elements during the actuation is reduced.

According to one embodiment, the holding element may have a substrate or, in addition or as an alternative, a cover, the holding element furthermore comprising an additional layer in which the actuation recess is formed. In this way, an actuation gap may be formed with the aid of a substrate layer or cover, depending on the embodiment. At the same time, the use of the additional layer, which is for example applied on or at the substrate or the cover, allows flexible and technically simple formation of the actuation recess in the holding element.

According to a further embodiment, the first mirror element may have at least one abutment for preventing connection, in particular due to abutment, of the first mirror element to the actuation recess and/or to the second mirror element. In addition or alternatively, the second mirror element may have at least one abutment for preventing connection, in particular following abutment, of the second mirror element to the first mirror element. Connection may in the present case, for example, be understood as meaning a permanent connection, for example a material connection such as adhesion. An abutment may, for example, be understood as meaning an abutment stud or an abutment pin. In this way, it is possible to prevent large-area contact and connection/adhesion between the first mirror element and the opposite boundary of the actuation recess, or between the first mirror element and the second mirror element.

The interferometer may furthermore have an additional electrode pair consisting of a first additional actuation electrode, which is defined on or in the first mirror element or is arranged or is arrangeable on a side of the first mirror element opposite the second mirror element, and a second additional actuation electrode, which is arranged or arrangeable on a side of the second mirror element opposite the first additional actuation electrode. In this case, the mirror spacing may be changeable by applying an electrical voltage to the additional electrode pair. This makes bidirectional changing of the mirror spacing possible.

It is furthermore advantageous for the interferometer to have a cover element, which is arranged or arrangeable opposite the second mirror element at a cover spacing in order to form a (further) actuation gap, the (further) actuation gap being spatially separated from the optical gap by the second mirror element. In this case, the interferometer may have a further electrode pair consisting of a first further actuation electrode, which is arranged or arrangeable on a side of the second mirror element opposite the cover element, and a second further actuation electrode, which is arranged or arrangeable on a side of the cover element opposite the first further actuation electrode. The cover spacing, which for example denotes the spacing of the second mirror element from the cover, may be changeable by applying an electrical voltage to the further actuation electrode pair. In this way, the maximum adjustable spacing of the mirror elements may be increased further. In particular, the cover element may have an antireflection coating and therefore have a lower reflectance and/or higher transmittance than an uncoated cover element of the same material.

According to one embodiment, the cover element may be configured as a transparent substrate, in particular as a glass wafer (borosilicate glass or alkali-free glass or soda-lime glass) or a quartz wafer. In this way, it is possible to produce a particularly broadband interferometer which is also suitable for wavelengths of less than 1100 nm, or more precisely wavelengths which correspond to a photon energy below the band gap of the substrate material.

According to a further embodiment, the interferometer may have at least one additional cover wafer, which may be arranged on a side of the holding element opposite the cover element in order to cover the interferometer on both sides. In this way, the interferometer may be protected against perturbing or environmental influences. In this case, it is advantageous for the additional cover wafer to be configured as a glass wafer and/or quartz wafer, for example in a similar way to the aforementioned cover element. A particularly broadband interferometer may also be produced by this embodiment.

According to a further embodiment, the interferometer may have at least one measurement electrode pair for measuring the mirror spacing. The measurement electrode pair may, for example, have at least two measurement electrodes arranged opposite one another. Depending on the embodiment, the measurement electrodes may be the actuation electrodes or additional electrodes. In this way, it is possible to measure precisely the mirror spacing (for example also indirectly), or at least its change by means of an indirect measurement.

According to a further embodiment, the holding element may have a through-opening opposite the first mirror element. In this way, the interferometer may be operated in a spectral range in which the holding element is absorbent. Furthermore, reflections in the optical path of the interferometer may thereby be reduced.

The approach proposed here furthermore provides a method for producing an interferometer, the method comprising the following steps:

arranging a first mirror element on a holding element, opposite an actuation recess of the holding element, and a second mirror element at a mirror spacing from the first mirror element in order to form an optical gap, the first mirror element being arranged between the second mirror element and the holding element and the optical gap being spatially separated from the actuation recess by the first mirror element; and forming an electrode pair by arranging or defining a first actuation electrode on or in a side of one of the mirror elements facing toward the actuation recess and a second actuation electrode on a side of the actuation recess opposite the first actuation electrode, the mirror spacing being changeable by applying an electrical voltage to the actuation electrode pair.

This method may for example be implemented in software or hardware or in a hybrid form consisting of software and hardware, for example in a control apparatus.

The approach proposed here furthermore provides a device which is adapted to carry out, control or implement the steps of a variant of a method as proposed here in corresponding instruments. The underlying object of the disclosure may also be achieved rapidly and efficiently by this embodiment variant in the form of a device.

To this end, the device may have at least one computer unit for processing signals or data, at least one memory unit for storing signals or data, at least one interface to a sensor or an actuator for reading sensor signals in from the sensor or for outputting data signals or control signals to the actuator and/or at least one communication interface for reading in or outputting data, which are embedded in a communication protocol. The computer unit may for example be a signal processor, a microcontroller or the like, in which case the memory unit may be a flash memory, an EPROM or a magnetic storage unit. The communication interface may be adapted to read in or output data wirelessly and/or via cables, in which case a communication interface that can read in or output data via cables may for example electrically or optically read these data in from a corresponding data transmission line or output them into a corresponding data transmission line.

In the present case, a device may be understood as meaning an electrical apparatus which processes sensor signals and outputs control signals and/or data signals as a function thereof. The device may have an interface which may be formed as hardware and/or software. In the case of a hardware embodiment, the interfaces may for example be part of a so-called system ASIC which contains a wide variety of functions of the device. It is, however, also possible for the interfaces to be separate integrated circuits or consist at least partially of discrete components. In the case of a software embodiment, the interfaces may be software modules, which are for example present in addition to other software modules on a microcontroller.

Also advantageous is a computer program product or computer program having program code which may be stored on a machine-readable carrier or storage medium such as a semiconductor memory, a hard disk memory or an optical memory, and which is used for carrying out, implementing and/or controlling the steps of the method according to one of the embodiments described above, in particular when the program product or program is run on a computer or a device.

BRIEF DESCRIPTION OF THE DRAWINGS

Exemplary embodiments of the disclosure are represented in the drawings and explained in more detail in the description below.

DETAILED DESCRIPTION

In the following description of favorable exemplary embodiments of the present disclosure, identical or similar references are used for the elements represented in the various figures which have a similar effect, repeated description of these elements being omitted.

Figure 1:
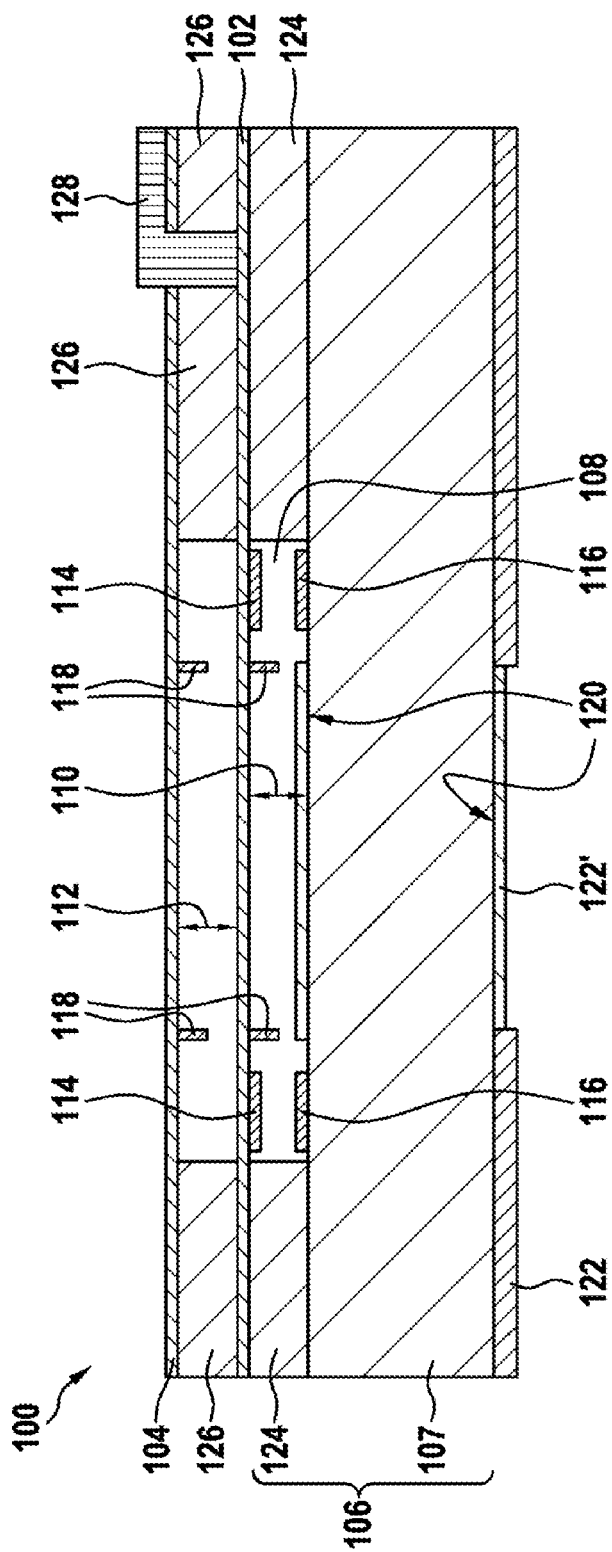
FIG. 1 shows a schematic representation of an interferometer according to one exemplary embodiment.

FIG. 1 shows a schematic representation of an interferometer 100 according to one exemplary embodiment. The interferometer 100 comprises a first mirror element 102 and a second mirror element 104, which is arranged at a changeable mirror spacing opposite the first mirror element 102. The first mirror element 102, here by way of example a lower mirror, is arranged on a holding element 106, which is based here by way of example on a substrate (wafer) 107 and an additional layer described in more detail below, opposite an actuation recess 108 of the holding element 106 and delimits therewith an actuation gap 110. Shown by way of example is a cross section through a Fabry-Pérot interferometer, in which the actuation is carried out electrostatically via the actuation gap 110, an initial spacing of the actuation gap 110 being adjustable independently of the mirror spacing. The second mirror element 104, here by way of example an upper mirror, delimits together with the first mirror element 102 an optical gap 112, which corresponds to the mirror spacing, the first mirror element 102 being arranged between the holding element 106 and the second mirror element 104, i.e. the two mirror elements 102, 104 are arranged on a common side of the holding element 106. The optical gap 112 is spatially separated from the actuation gap 110, or the actuation recess 108, by the first mirror element 102.

For changing the mirror spacing, the interferometer 100 has an electrode pair consisting of a first actuation electrode 114 and a second actuation electrode 116. The first actuation electrode 114 is arranged on a side of the first mirror element 102 facing toward the actuation recess 108, while the second actuation electrode 116 is arranged on a side of the actuation recess 108 opposite the first actuation electrode 114. Advantageously, one or a plurality of the actuation electrodes 114, 116 may be configured annularly. The mirror spacing is changeable by applying a suitable actuation voltage to the electrode pair. Likewise conceivable is integration of the first actuation electrode 114 into the first mirror element 102 itself (i.e. definition of the first actuation electrode 114 in the first mirror element 102), for example by local doping. In one exemplary embodiment, this first actuation electrode 114 may in the simplest case also be configured two-dimensionally and the actuation may result from the, for example, annular counter-electrode.

FIG. 1 furthermore shows optional abutment studs 118 (which may also be referred to as an abutment), an optional antireflection layer 120 on both sides of the holding element 106, or more precisely of the substrate 107, in the region of an optical aperture, a layer which is reflective and/or absorbent in the relevant wavelength range as an aperture stop 122 for forming an optical aperture 122', a first sacrificial layer 124 (as an additional layer for forming the actuation recess herein) and a second sacrificial layer 126 (as a further additional layer for holding the second mirror element 104 and for forming the optical gap 112 herein). For example, the first sacrificial layer 124 and/or the second sacrificial layer 126, which is used here as an additional layer or as a further additional layer, may have particularly favorable etching properties in relation to the substrate 107 and the mirror elements, so that the actuation recess 108 may be formed particularly simply in this additional layer. In this case, the first mirror element 102 is arranged between the first sacrificial layer 124 and the second sacrificial layer 126, while the second mirror element 104 is arranged on the second sacrificial layer 126, the second sacrificial layer 126 being arranged between the first mirror element 102 and the second mirror element 104. For example, the electrical contacting of the electrode pair is carried out by means of a contact element 128, which extends at least through the second sacrificial layer 126. This is a simplified representation, which shows the case of unidirectional actuation.

According to one exemplary embodiment, the Fabry-Pérot interferometer 100 comprises two mirror elements 102, 104, which are spaced apart from one another and which are supported on a holding element 106 on the basis of a substrate 107, at least one of the mirror elements being mobile, the movement being inducible by means of actuation, the actuation being electrostatic, the mirror spacing being variable by the actuation and the variation involving an active increase of the mirror spacing.

Depending on the exemplary embodiment, the mirror elements 102, 104 are embodied as a DBR membrane mirror (DBR=distributed Bragg reflector) or as a mechanical carrier membrane having a mirror layer. The membrane mirrors preferably have a tensile prestress. The spacing-apart both of the mirror elements from one another and of the mirror elements from the substrate is carried out for instance by means of a surface-micromechanical sacrificial layer, for example the first sacrificial layer 124 and/or the second sacrificial layer 126. The sacrificial layer is, for example, removed by means of an etching process at least in the optically free region of the optical aperture 122', so that the mirror elements 102, 104 are exposed. An electrode, which depending on the exemplary embodiment has a locally doped semiconductor material or is metallic, is arranged on at least one membrane and the substrate 107 or at least one membrane and/or a cover described in more detail below. The mirror elements 102, 104 are configured for example as a Bragg mirror consisting of dielectric or layers which have no or little absorption in a wavelength range, for example Si, Ge, SiN, $SiO_2$, SiCN, $TiO_x$ or SiC, or as a carrier membrane with a metal mirror (with protective layers consisting of one of the aforementioned materials), for instance made of Ag, Cu, Al or Au. Active position detection may, for example, be carried out by means of capacitive or piezoresistive detection. The MEMS wafer is optionally covered on one or two sides, for instance with a silicon wafer cover or glass wafer cover.

One essential problem of electrostatic spring-actuator systems is the so-called pull-in phenomenon, by which it is no longer possible to adjust a stable spacing between two actuation electrodes as soon as a critical displacement path is exceeded. The reason for this is the superlinear increase of the electrostatic force with the displacement path in comparison with the linear increase of the spring force, which acts as a restoring force. The force which is exerted by an electrostatic actuator is given by $$F_{ei} = -\frac{1}{2}\frac{dC}{dx}U^2.$$

The force therefore depends on the change in the capacitance C with the displacement path x and the applied voltage U. For a plate capacitor, the following applies for the capacitance:

$$C(x) = \varepsilon_0 \frac{A}{d_0 - x},$$

where $d_0$ denotes the gap spacing of the electrostatic actuator in the resting position and A denotes its area. A plate capacitor which is suspended from a spring is assumed here as a simplified geometry. This approximation may indeed be made in most applications, since many real systems may be reduced to this idealized basic system. Furthermore, this simplified model system merely serves to illustrate the underlying problem. For a spring with a spring stiffness k, a restoring force of $$F_F = -kx$$

is then obtained with a displacement path x. Since deflection of the actuator reduces the electrostatic gap, the electrostatic force likewise increases, in fact superlinearly, with an increasing deflection. There is therefore a critical deflection $x_{PI}$ at which the spring force can no longer compensate for the electrostatic force and at which there is no stable equilibrium position. This point is generally referred to as the pull-in or snap-in point, and, independently of the spring stiffness k and the electrode area, always lies at one third of the gap spacing $d_0/3$ and occurs at a voltage $U_{PI}$ which, for the simplified system, is given by the following relationship:

$$U_{PI} = \sqrt{\frac{8}{27}\frac{kd_0^3}{\varepsilon_0 A}}.$$

Here, the variables denote the quantities already introduced. This phenomenon represents a fundamental limitation of the electrostatically actuatable displacement path. In order to produce a Fabry-Pérot interferometer with a working spectral range that is as large as possible, it is necessary to find ways of working around this, since inter alia the maximum displacement path of the mirrors with respect to one another also determines the maximum tunable spectral range. The problem with hitherto produced Fabry-Pérot interferometers may be regarded as being that the optical gap and the actuation gap coincide, which limits the tunability because of pull-in. The approach proposed here overcomes this problem by spatial separation of precisely these two gaps.

According to one exemplary embodiment, the mirror elements 102, 104 are configured as membranes with a tensile prestress. These are stretched over a free area and thereby define the required spring. The tensile prestress is advantageous in order to reduce sagging of the membranes due to gravity and in order to increase the natural frequency of the spring system, so that there is a greater robustness in respect of the coupling in of external vibrations. Both dielectric, or nonabsorbent, layer systems, so-called Bragg reflectors, and metallic mirrors on carrier structures or nanostructured plasmonic mirror structures may be used as the material for the membrane mirrors. The mechanical advantage of these systems is a high natural frequency because of the low mass, and therefore a very low position sensitivity of the membrane mirrors in comparison with layer mirrors that are applied on solid carrier structures. At the same time, the high natural frequency is achieved with a relatively low spring stiffness, which may also be adjustable by a defined layer stress. A further advantage of the approach described here in comparison with other membrane-based Fabry-Pérot interferometers is the production of a mechanically symmetrical system consisting of two mechanically equivalent mirrors, which has an additional insensitivity to external perturbations, for example vibrations. Furthermore, the configuration of the Fabry-Pérot interferometer 100 with two mobile membranes additionally allows bidirectional actuation, for example through attraction of the two membranes by the selection of suitable potentials. A prerequisite for this is the definition of suitable electrodes on or in the mirror layers. Such actuation is advantageous since, for the same maximum voltage, it allows an increased maximum adjustable spacing of the mirror elements from one another.

For the operation of a Fabry-Pérot interferometer, it is furthermore advantageous for the two mirror elements 102, 104 to have the same spectral reflection characteristic. Otherwise, it is not possible to achieve maximum transmission at the transmission wavelength, which results in a signal loss. For Fabry-Pérot interferometers consisting of a membrane mirror and a mirror on a fixed substrate, this is achievable only with difficulty over a large spectral range, since the two mirrors are not identical because the membrane mirror is bounded on both sides by air and the substrate mirror is bounded on one side by the substrate. According to the approach proposed here, both mirror elements 102, 104 are automatically configured as a membrane, so that they can be produced very easily in the same way and they therefore have the same reflection characteristic.

The two reflective membranes have a defined spacing from one another and are connected to a substrate material. The reflectivity of the membranes is, for example, achieved by metal layers on carrier structures or by a Bragg mirror. The membranes have been produced so as to be mobile in a direction perpendicular to the plane of the membranes by suitable sacrificial layer processes in a defined region. A maximally high parallelism, or plane-parallelism, of the membranes, which may for example be achieved by suitable tensile mechanical prestressing of the membrane layers, is advantageous. At least one of the two membranes may be moved by applying an electrical voltage, so that the spacing of the two reflective membranes or mirrors is modified. In this way, the transmission wavelength of the Fabry-Pérot interferometer thereby formed may be controlled. In order to produce this movement, there are actuation electrodes 114 on at least one of the membranes. There are furthermore further actuation electrodes 116 matching the latter in at least one plane above or below the two mirror membranes 102, 104. The production of the actuation electrodes 114, 116 is carried out, for example, by deposition and optional structuring of a conductive layer or by controlled doping of a semiconductor material.

FIG. 1 shows by way of example an exemplary embodiment in which actuation electrodes are located on the lower mirror 102 and on the substrate wafer 107. An actuation recess 108 is produced between the two planes by a suitable sacrificial layer process. By applying a voltage between the electrode pair 114, 116, the first mirror element 102 is attracted toward the holding element 106, or the substrate 107, so that the spacing of the two mirror elements 102, 104 from one another is increased. A crucial advantage of this embodiment is that the initial spacing of the electrode pairs 114, 116 can be adjusted substantially independently of the initial spacing of the two mirror membranes 102, 104, and therefore, with a sufficiently large electrode spacing, the displacement path is not limited to one third of the initial optical mirror spacing by pull-in.

Optionally, studs acting as an abutment 118 are added, these limiting the deflection of the membranes 102, 104 and in cases of contact being made contributing to the structures separating more easily from one another, since the contact area is kept small. Antireflection layers 120 on all interfaces in the optical path that are not part of the mirrors 102, 104 are also advantageous. It is also advantageous to use the optical aperture 122' in order to limit the optical light path and the angle of incidence by reflection and/or absorption.

Figure 2:
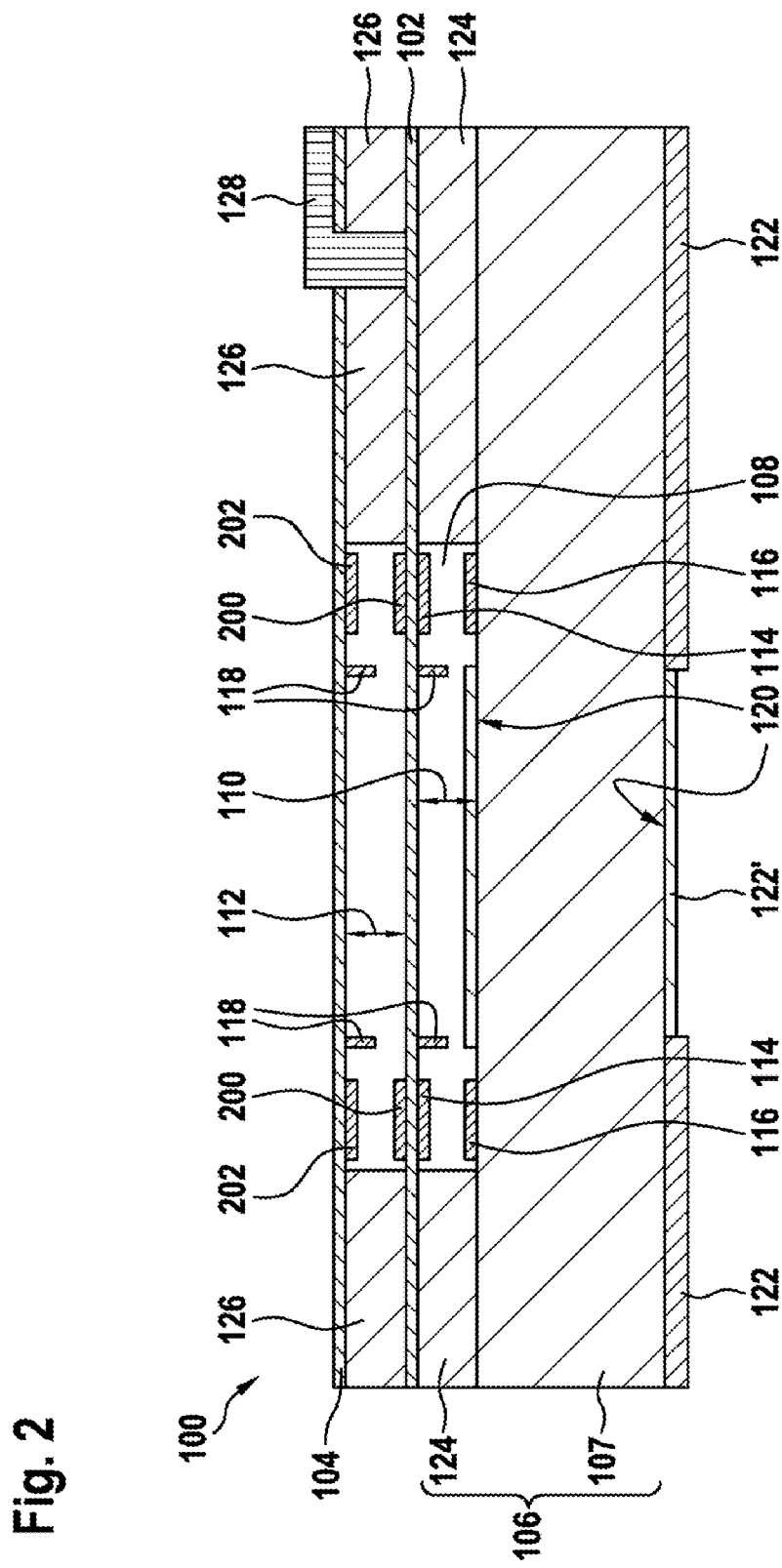
FIG. 2 shows a schematic representation of an interferometer according to one exemplary embodiment.

FIG. 2 shows a schematic representation of an interferometer 100 according to one exemplary embodiment. In contrast to FIG. 1, the interferometer 100 according to this exemplary embodiment has an additional electrode pair consisting of a first additional actuation electrode 200 and a second additional actuation electrode 202. In this case, the first additional actuation electrode 200 is arranged on a side of the first mirror element 102 opposite the second mirror element 104, while the second additional actuation electrode 202 is arranged on a side of the second mirror element 104 opposite the first additional actuation electrode 200. Actuation between the mirror elements 102, 104 is therefore additionally possible. The representation of the electrical contacting is represented in a highly simplified way here. For example, different contacts for the various electrodes are not represented in the figure. Likewise conceivable is an exemplary embodiment in which the electrodes 114 and 200 are identical, which is typically the case with production by means of doping.

In other words, FIG. 2 shows an exemplary embodiment in which there are also electrodes 200, 202 between the mirror elements 102, 104. In this way, reduction of the initial mirror spacing is additionally possible. Furthermore, for the same displacement path of the mirror elements 102, 104, the electrical voltages required therefor are reduced.

Figure 3:
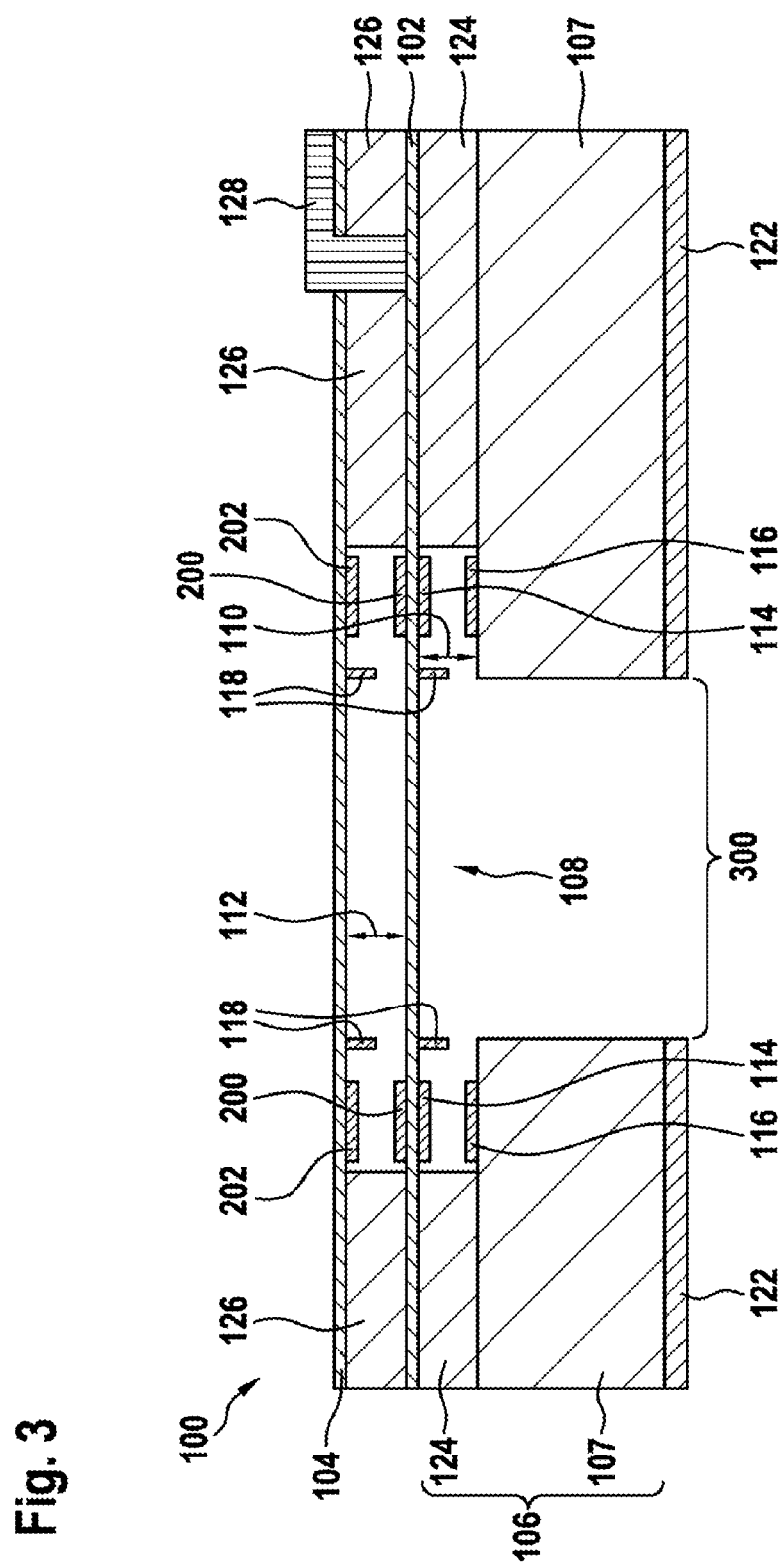
FIG. 3 shows a schematic representation of an interferometer according to one exemplary embodiment.

FIG. 3 shows a schematic representation of an interferometer 100 according to one exemplary embodiment. In contrast to FIG. 2, the interferometer 100 according to this exemplary embodiment has a through-opening 300 in the substrate 107 in the region of the actuation recess 108. To this end, for example, substrate material in the optical path has been removed. The Fabry-Pérot interferometer 100 may therefore also be operated in a spectral range in which the substrate 107 is absorbent. Furthermore, the overall transmission of the Fabry-Pérot interferometer 100 is increased by the absence of reflections at further interfaces in the optical path.

Figure 4:
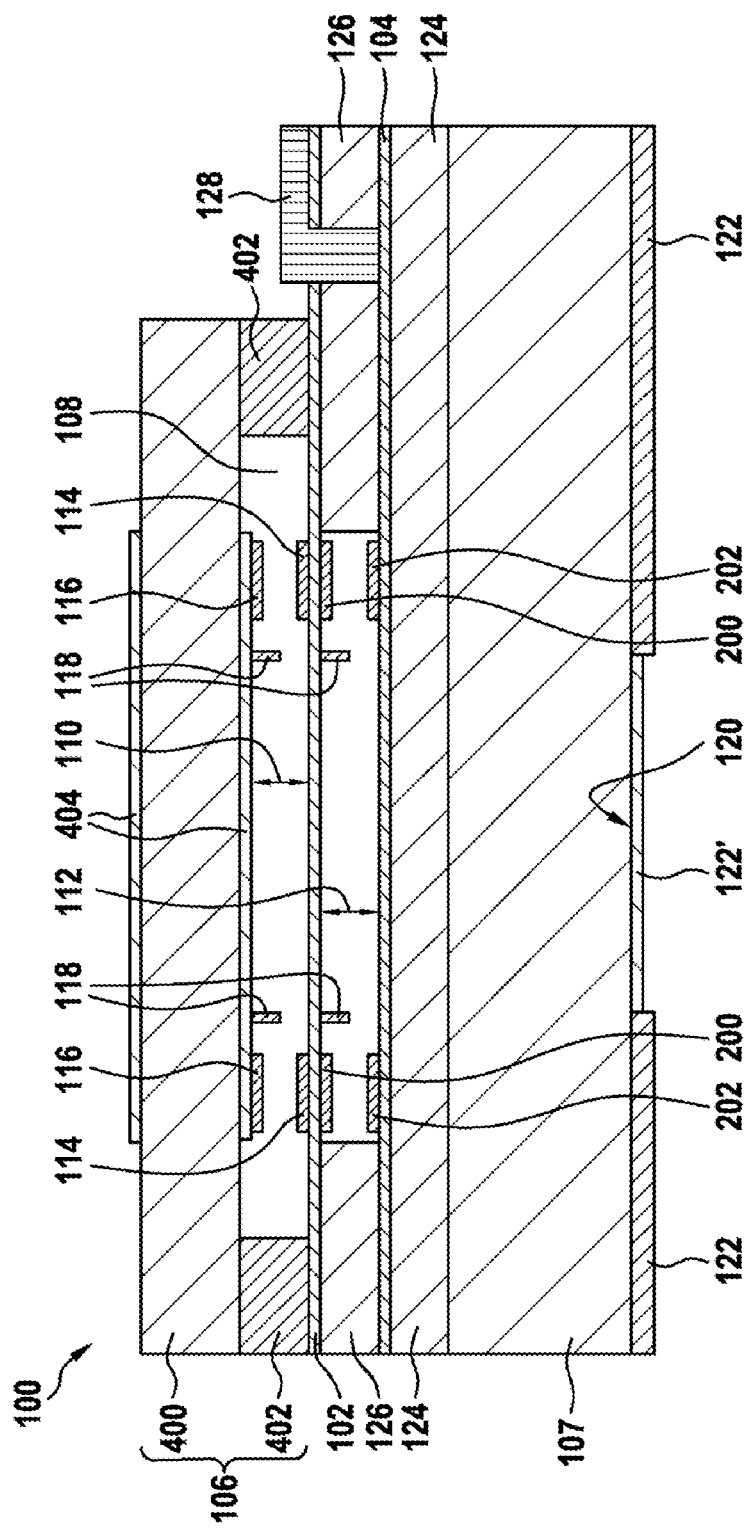
FIG. 4 shows a schematic representation of an interferometer according to one exemplary embodiment.

FIG. 4 shows a schematic representation of an interferometer 100 according to one exemplary embodiment. The interferometer 100 corresponds substantially to the interferometer described above with the aid of FIGS. 1 to 3. An exemplary embodiment in which actuation is possible between the first mirror element 102 and an additional cover wafer or a cover 400 as the basis of the holding element 106 is shown. In this case, the first mirror element 102 is arranged between the cover wafer or the cover 400 and a substrate (wafer) 107 together with the first sacrificial layer 124, onto which the second mirror element 104 is applied. Furthermore shown are an optional wafer bond connection 402 (here now by way of example as an additional layer of the cover 400 for forming the holding element 106) and an optional cover antireflection layer 404, which is applied on a side of the cover wafer or the cover 400 facing away from and/or toward the actuation gap 110.

In addition to actuation between a first mirror element and a holding element or substrate, an embodiment in which electrodes on an additional cover wafer or the cover 400 allow movement of the upper mirror upward, so that the mirror spacing is likewise increased, may also be envisioned. As may be seen in FIG. 4, the spacing of the electrode pair is adjusted here by the wafer bond connection 402. By virtue of the cover 400, the inclusion of a defined pressure is additionally possible. Furthermore, the cover 400 of the holding element 106 protects the Fabry-Pérot interferometer 100 against external influences such as moisture and impurities. The cover wafer or the cover 400 is, for example, made of silicon or glass.

Figure 5:
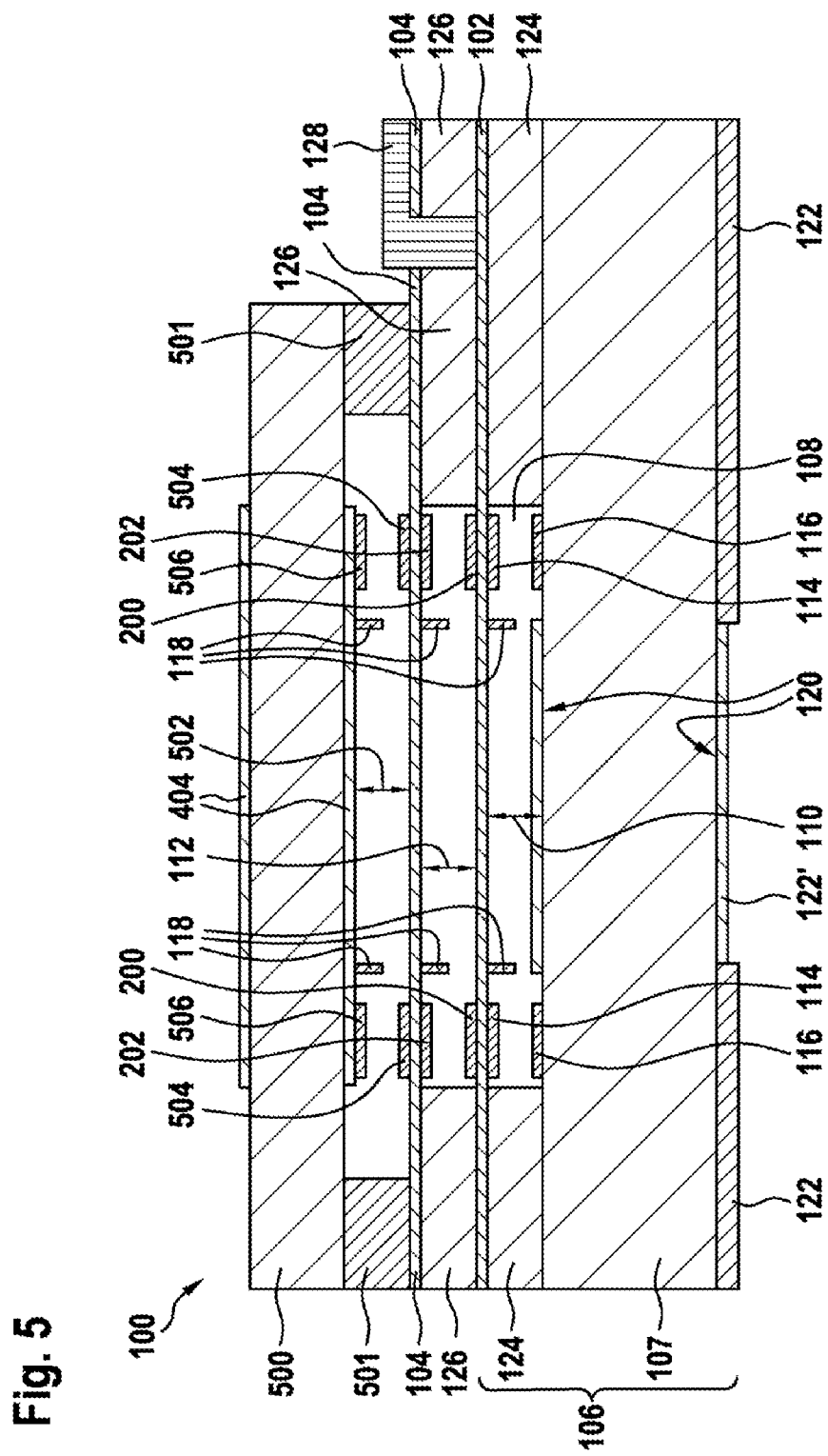
FIG. 5 shows a schematic representation of an interferometer according to one exemplary embodiment.

FIG. 5 shows a schematic representation of an interferometer 100 according to one exemplary embodiment. According to this exemplary embodiment, the interferometer 100 comprises a cover element 500 in a similar way to the cover wafer 400 described above with the aid of FIG. 4. The cover element 500 is arranged, by means of a wafer bond connection 501, opposite the second mirror element 104 at a cover spacing and delimits with the latter a further actuation gap 502, which is spatially separated from the optical gap 112 by the second mirror element 104. In addition, the interferometer 100 comprises a further electrode pair consisting of a first further actuation electrode 504, which is arranged on a side of the second mirror element 104 opposite the cover element 500, and a second further actuation electrode 506, which is arranged on a side of the cover element 500 opposite the first further actuation electrode 504. In this case as well, an exemplary embodiment in which integration of the electrode or thus the coincidence of two electrodes is possible, as would be the case for example by doping, may be envisioned. The cover spacing is changeable by applying a suitable actuation voltage to the further electrode pair. The two mirror elements 102, 104 are therefore movable in both directions by applying the appropriate electrical voltages. The electrical voltages required for comparable changes of the mirror spacing may here again be reduced because of the bidirectional actuation.

Figure 6:
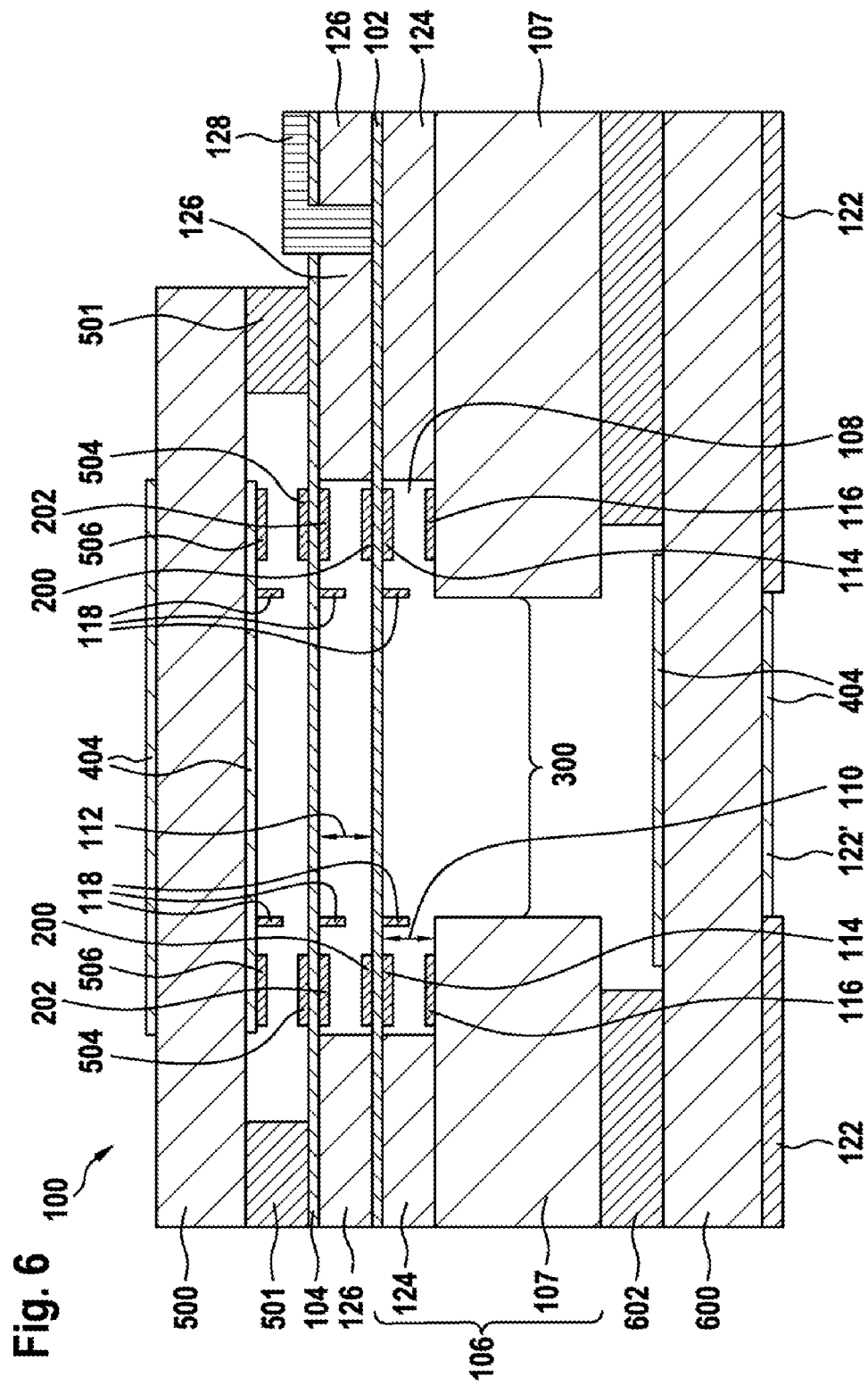
FIG. 6 shows a schematic representation of an interferometer according to one exemplary embodiment.

FIG. 6 shows a schematic representation of an interferometer 100 according to one exemplary embodiment. In contrast to FIG. 5, the interferometer 100 according to this exemplary embodiment has the through-opening 300 of FIG. 3 and an additional cover wafer 600, which covers the through-opening 300 on a side of the holding element 106 or the substrate 107 opposite the first mirror element 102, so that the through-opening 300 is covered on the one hand by the first mirror element 102 and on the other hand by the additional cover wafer 600. For example, the additional cover wafer 600 is applied on the holding element 106 by means of an additional wafer bond connection 602.

If the upper cover wafer 500 is used in combination with the through-opening 300 in the substrate material, the additional connection to the second cover wafer 600 on the rear side may be expedient in order also to achieve encapsulation of the Fabry-Pérot interferometer 100 and stabilization of the component. Here again, antireflection layers 404 and optical apertures are optionally applied on the cover wafers 500, 600.

Figure 7:
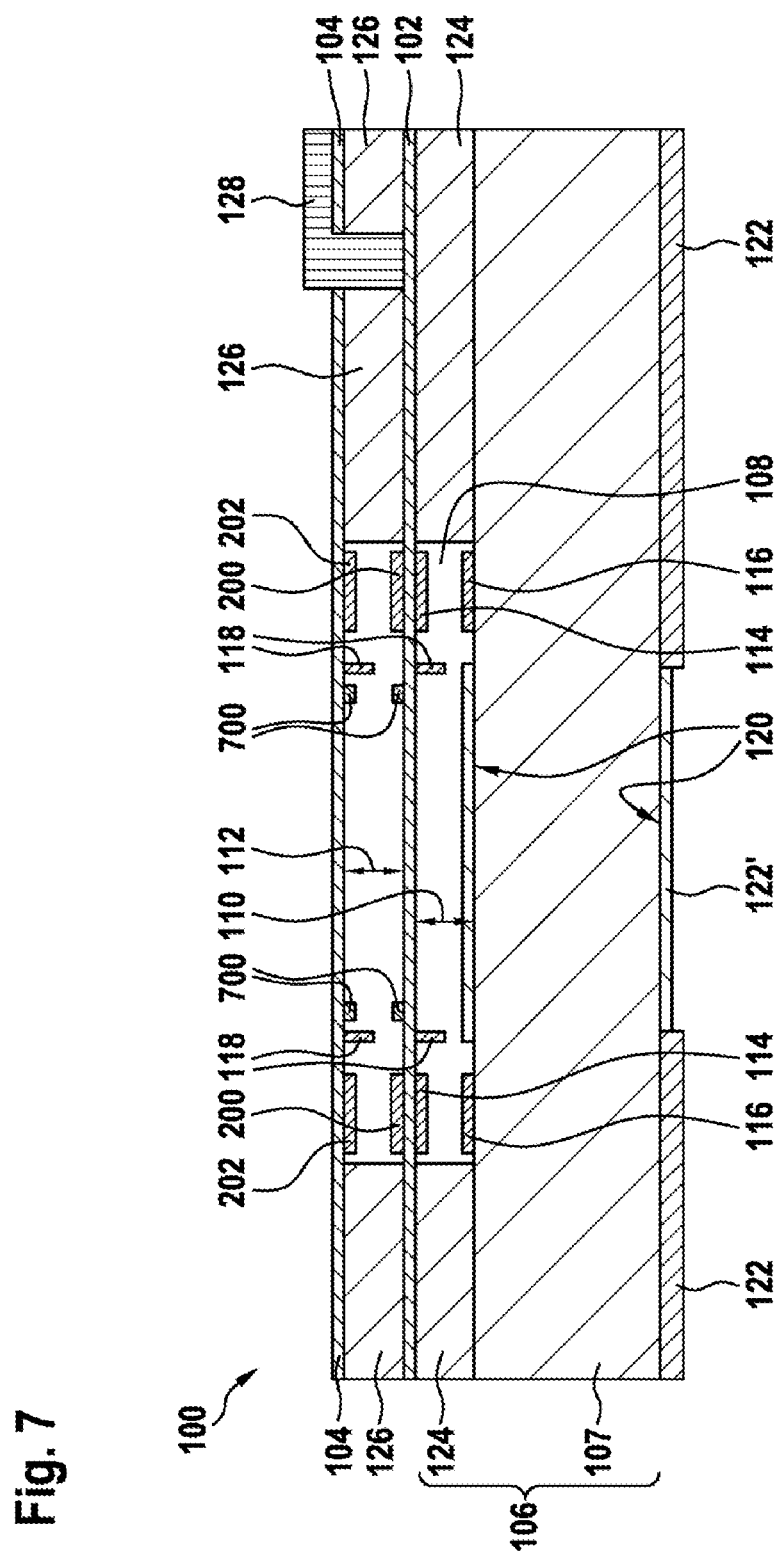
FIG. 7 shows a schematic representation of an interferometer according to one exemplary embodiment.

FIG. 7 shows a schematic representation of an interferometer 100 according to one exemplary embodiment. The interferometer 100 is very similar to the exemplary embodiment described above with the aid of FIG. 2. In contrast to FIG. 2, however, the interferometer 100 according to FIG. 7 has a measurement electrode pair consisting of measurement electrodes 700, each of which is arranged and formed in the optical gap 112 in order to measure the mirror spacing, for example capacitively. Position monitoring may therefore be integrated into the interferometer 100.

As an alternative, the actuation electrodes may be used for this measurement. The capacitive spacing measurement is optionally carried out with more than two electrode pairs, for example in order to achieve differential capacitive evaluation.

Figure 8:
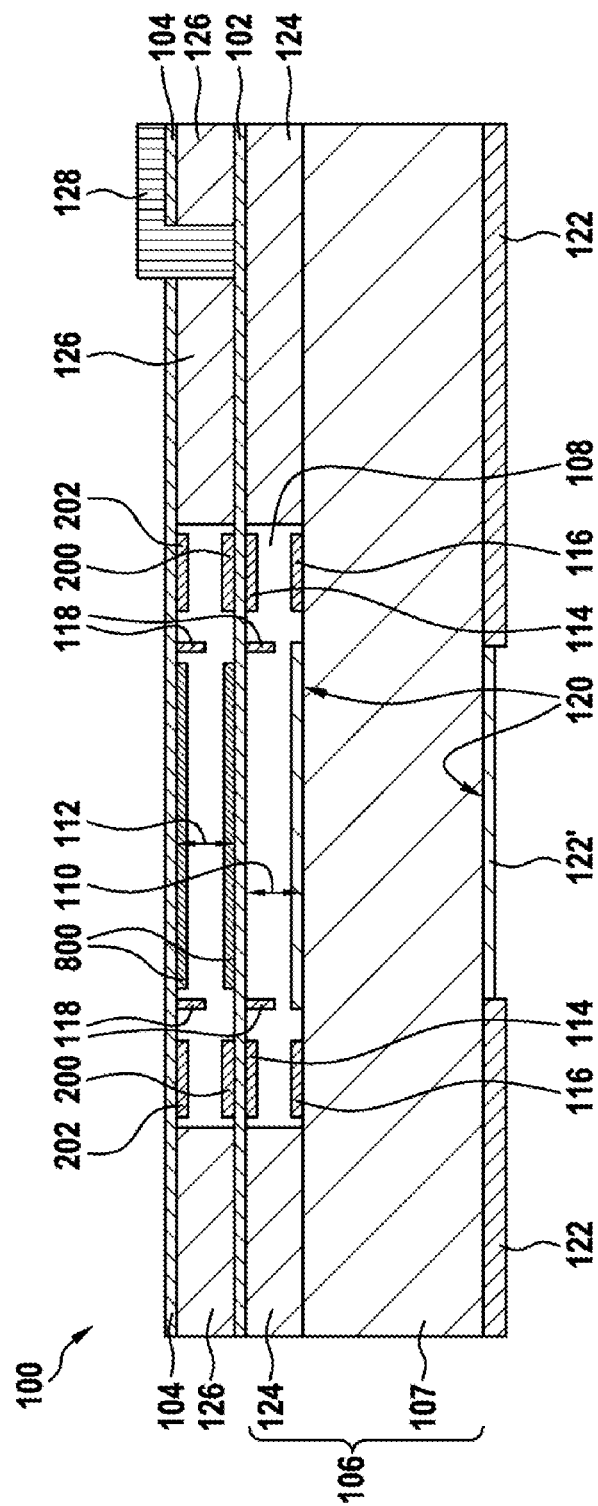
FIG. 8 shows a schematic representation of an interferometer according to one exemplary embodiment.

FIG. 8 shows a schematic representation of an interferometer 100 according to one exemplary embodiment. The interferometer 100 is constructed in a similar way to the interferometer described above with the aid of FIG. 2. In contrast thereto, however, the interferometer 100 according to FIG. 8 has additional electrodes 800, which are integrated in the optical path of the interferometer 100. For example, the additional electrodes 800 are arranged opposite one another and centrally in the optical gap 112.

Warping of the membranes 102, 104 in the optical region is minimized by preventing electrostatic forces in this region by the additional electrodes 800 with the same electrostatic potential, which has an advantageous effect on the achievable spectral resolution of the Fabry-Pérot interferometer 100.

Figure 9:
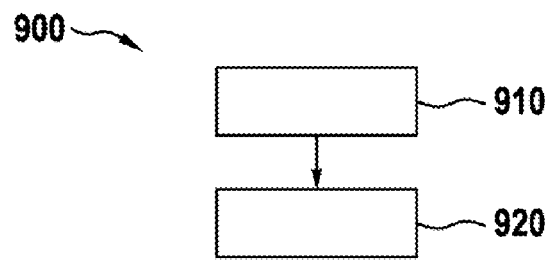
FIG. 9 shows a flowchart of a method according to one exemplary embodiment.

FIG. 9 shows a flowchart of a production method 900 according to one exemplary embodiment, which may for example be carried out in order to produce an interferometer as described above with the aid of FIGS. 1 to 8. The method 900 comprises a step 910 in which the first mirror element is arranged on the holding element, opposite the actuation recess, and the second mirror element is arranged at the mirror spacing opposite the first mirror element, in order to form the optical gap. In this case, the first mirror element is arranged between the second mirror element and the holding element and the optical gap is spatially separated from the actuation recess by the first mirror element. In a further step 920, the electrode pair is formed by arranging or defining the first actuation electrode on or in a side of one of the mirror elements facing toward the actuation recess and a second actuation electrode on a side of the actuation recess opposite the first actuation electrode. The mirror spacing is in this case changeable by applying an electrical voltage to the electrode pair. In this case, it should be noted that a production method contains these steps. The order in which such steps are carried out is not, however, important.

Figure 10:
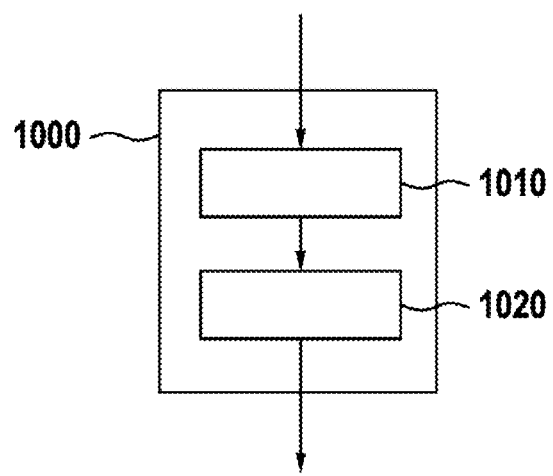
FIG. 10 shows a block diagram of a device according to one exemplary embodiment.

FIG. 10 shows a block diagram of a device 1000 for producing an interferometer, the device 1000 having a unit 1010 for arranging a first mirror element on a holding element, opposite an actuation recess of the holding element, and a second mirror element at a mirror spacing opposite the first mirror element, in order to form an optical gap, the first mirror element being arranged between the second mirror element and the holding element and the optical gap being spatially separated from the actuation recess by the first mirror element. The device 1000 furthermore comprises a unit 1020 for forming an electrode pair by arranging or defining a first actuation electrode on or in a side of one of the mirror elements facing toward the actuation recess and a second actuation electrode on a side of the actuation recess opposite the first actuation electrode, the mirror spacing being changeable by applying an electrical voltage to the electrode pair.

Figure 11:
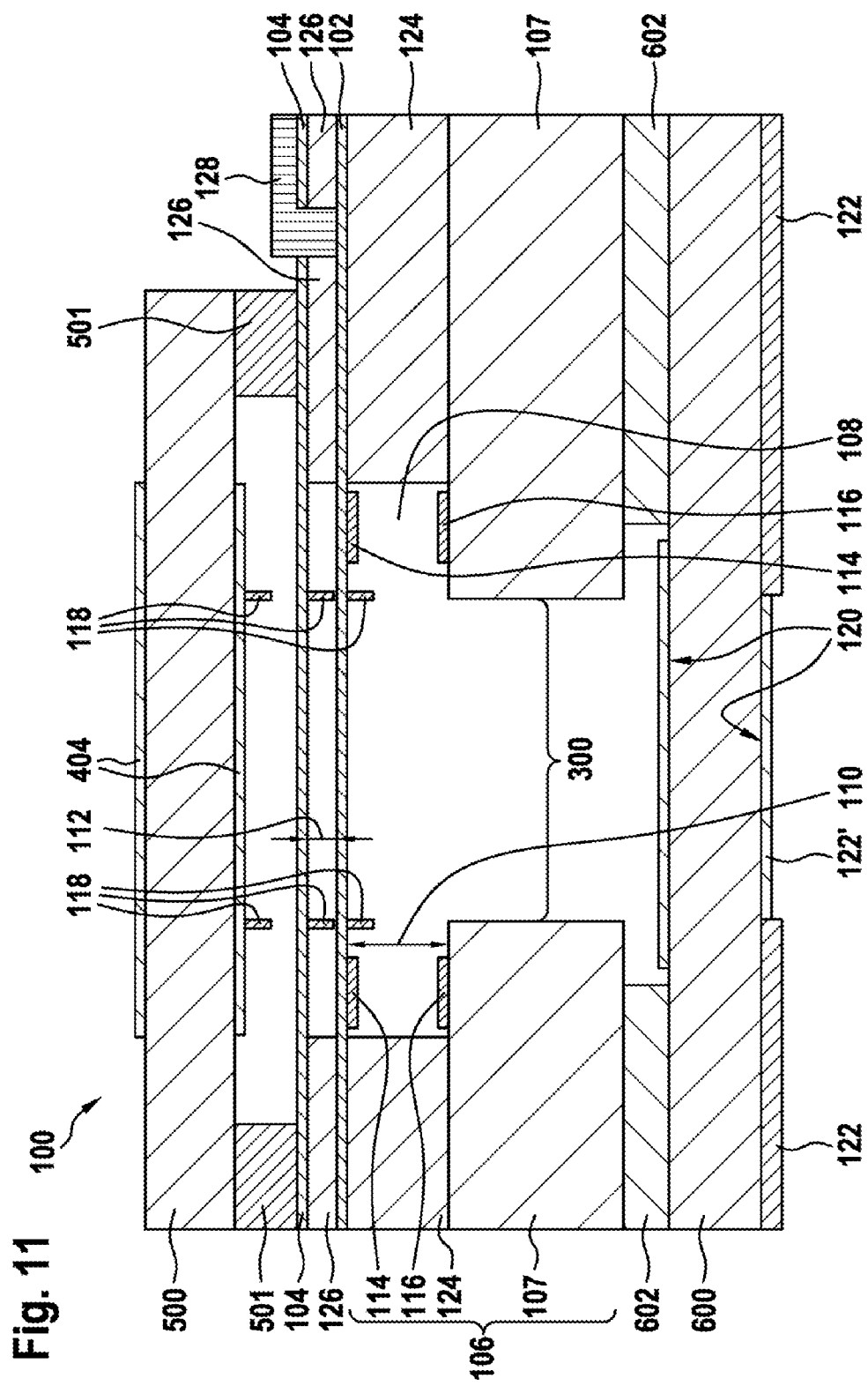
FIG. 11 shows a schematic representation of an interferometer according to one exemplary embodiment.

FIG. 11 shows a schematic representation of an interferometer 100 according to one exemplary embodiment. A particularly favorable exemplary embodiment of the interferometer described above with the aid of FIG. 6 is shown. According to FIG. 11, the interferometer 100 consists of a combination of a MEMS Fabry-Pérot interferometer 100 with a through-opening 300 in the holding element 106 and at the same time covering with glass wafers as the cover element 500 and the additional cover wafer 600.

In this way, with at the same time transparent covering, relatively thick silicon regions are removed from the beam path, which makes such a structure also compatible for wavelengths of less than 1100 nm, in which silicon absorbs electromagnetic radiation. By the combination with the downward actuation of the first mirror element 102, here a lower mirror, and a broadband mirror, extremely broadband Fabry-Pérot interferometers may thus be produced. A broadband Fabry-Pérot interferometer may, according to the approach proposed here, be understood as meaning a tunable narrowband Fabry-Pérot interferometer which is tunable over a wide spectral range.

In addition, the general advantages of a covered Fabry-Pérot interferometer are maintained, such as protection against environmental moisture, inclusion of a defined internal pressure, particle robustness, protection during sawing or overall size of a chip-scale package.

According to this exemplary embodiment, the two mirror elements 102, 104 are produced as mirror membranes that are separated from one another by the optical gap 112. In this case, the first mirror element 102 together with the holding element 106 forms the actuation gap 110.

Transparent cover materials suitable for wavelengths of less than 1100 nm are, for example, germanium, quartz, borosilicate glasses, glasses with an appropriate thermal expansion, other special glasses, or sapphire. The glass wafers are, for example, fastened in the interferometer 100 by eutectic bonding or bonding with sealing glass.

If an exemplary embodiment contains an "and/or" combination between a first feature and a second feature, this is to be understood as meaning that the exemplary embodiment according to one embodiment has both the first feature and the second feature, and according to a further embodiment has either only the first feature or only the second feature.

The invention claimed is:

1. An interferometer comprising:
   a holding element defining an actuation recess;
   a first mirror element arranged or arrangeable on the holding element, opposite the actuation recess;
   a second mirror element arranged or arrangeable opposite the first mirror element at a mirror spacing in order to form an optical gap, the first mirror element being arranged or arrangeable between the second mirror element and the holding element, and the optical gap being spatially separated from the actuation recess by the first mirror element;
   an electrode pair comprising a first actuation electrode defined, arranged or arrangeable on or in one of the first and second mirror elements, and a second actuation electrode defined, arranged or arrangeable on a side of the actuation recess opposite the first actuation electrode, the mirror spacing being changeable by applying an electrical voltage to the electrode pair; and
   an additional electrode pair comprising a first additional actuation electrode defined on or in the first mirror element or arranged or arrangeable on a side of the first mirror element opposite the second mirror element, and a second additional actuation electrode arranged or arrangeable on a side of the second mirror element opposite the first additional actuation electrode, the mirror spacing being changeable by applying an electrical voltage to the additional electrode pair.

2. The interferometer as claimed in claim 1, wherein the first actuation electrode is defined, arranged, and/or arrangeable on or in the first mirror element.

3. The interferometer as claimed in claim 1, wherein the holding element further comprises:
   a substrate with the second actuation electrode mounted thereon; and
   an additional layer, separate from the substrate, in which the actuation recess is defined.

4. The interferometer as claimed in claim 1, wherein (i) the first mirror element has at least one first abutment configured to prevent connection of the first mirror element to the actuation recess and/or to the second mirror element, and/or (ii) the second mirror element has at least one second abutment configured to prevent connection of the second mirror element to the first mirror element.

5. The interferometer as claimed in claim 1, further comprising:
   a cover element arranged or arrangeable opposite the second mirror element at a cover spacing in order to form an actuation gap, the actuation gap being spatially separated from the optical gap by the second mirror element; and
   a further electrode pair comprising:
      a first further actuation electrode defined on or in the first mirror element or arranged or arrangeable a side of the second mirror element opposite the cover element; and
      a second further actuation electrode arranged or arrangeable on a side of the cover element opposite the first further actuation electrode, the cover spacing being changeable by applying an electrical voltage to the further electrode pair.

6. The interferometer as claimed in claim 5, wherein the cover element is configured as a transparent substrate.

7. The interferometer as claimed in claim 6, wherein the transparent substrate is a glass substrate.

8. The interferometer as claimed in claim 5, further comprising:
at least one additional cover wafer arranged on a side of the holding element opposite the cover element in order to cover the interferometer on both sides.

9. The interferometer as claimed in claim 8, wherein the additional cover wafer is configured as a transparent substrate.

10. The interferometer as claimed in claim 9, wherein the transparent substrate is a glass substrate.

11. The interferometer as claimed in claim 1, further comprising:
at least one measurement electrode pair configured to measure the mirror spacing.

12. The interferometer as claimed in claim 1, wherein the holding element defines a through-opening opposite the first mirror element.

13. A method for producing an interferometer, the method comprising:
arranging a first mirror element on a holding element, opposite an actuation recess of the holding element, and a second mirror element at a mirror spacing from the first mirror element in order to form an optical gap, the first mirror element being arranged between the second mirror element and the holding element and the optical gap being spatially separated from the actuation recess by the first mirror element;
forming an electrode pair by arranging or defining a first actuation electrode on or in a side of one of the mirror elements facing toward the actuation recess and arranging or defining a second actuation electrode on a side of the actuation recess opposite the first actuation electrode, the mirror spacing being changeable by applying an electrical voltage to the electrode pair; and
forming an additional electrode pair by arranging or defining a first additional actuation electrode on or in the first mirror element on a side of the first mirror element opposite the second mirror element, and arranging or defining a second additional actuation electrode on a side of the second mirror element opposite the first additional actuation electrode, the mirror spacing being changeable by applying an electrical voltage to the additional electrode pair.

14. A computer program configured to carry out and/or control the method as claimed in claim 13.

15. A machine-readable storage medium comprising: at least one memory on which the computer program as claimed in claim 14 is stored.

16. A device comprising:
a first unit configured to arrange a first mirror element on a holding element opposite an actuation recess of the holding element, and a second mirror element at a mirror spacing from the first mirror element in order to form an optical gap, the first mirror element being arranged between the second mirror element and the holding element and the optical gap being spatially separated from the actuation recess by the first mirror element;
a second unit configured to form an electrode pair by arranging or defining a first actuation electrode on or in a side of one of the mirror elements facing toward the actuation recess and a second actuation electrode on a side of the actuation recess opposite the first actuation electrode, the mirror spacing being changeable by applying an electrical voltage to the electrode pair; and
an additional unit configured to form an additional electrode pair by arranging or defining a first additional actuation electrode on or in the first mirror element on a side of the first mirror element opposite the second mirror element, and by arranging or defining a second additional actuation electrode on a side of the second mirror element opposite the first additional actuation electrode, the mirror spacing being changeable by applying an electrical voltage to the additional electrode pair.

* * * * *